Feb. 21, 1967 HIROSHI AMEMIYA 3,305,846

MEMORY WITH IMPROVED ARRANGEMENT OF CONDUCTORS LINKING MEMORY ELEMENTS TO REDUCE DISTURBANCES

Filed June 5, 1963 2 Sheets-Sheet 1

INVENTOR.
HIROSHI AMEMIYA

BY

Carl V. Olson

Attorney

Feb. 21, 1967 HIROSHI AMEMIYA 3,305,846

MEMORY WITH IMPROVED ARRANGEMENT OF CONDUCTORS LINKING MEMORY ELEMENTS TO REDUCE DISTURBANCES

Filed June 5, 1963 2 Sheets-Sheet 2

INVENTOR
HIROSHI AMEMIYA
BY
Carl V. Olson
Attorney 3,305,846
MEMORY WITH IMPROVED ARRANGEMENT OF CONDUCTORS LINKING MEMORY ELEMENTS TO REDUCE DISTURBANCES Hiroshi Amemiya, Levittown, N.J., assignor to Radio Corporation of America, a corporation of Delaware
Filed June 5, 1963, Ser. No. 285,783
11 Claims. (Cl. 340—174)

This invention relates to memories, and particularly to random-access memory arrays having memory elements such as ferrite magnetic cores.

It is a general object of this invention to provide a memory characterized in having an improved arrangement of memory elements, conductors linking the memory elements, and drive and sense circuits coupled to the conductors.

It is another object to provide a memory stack having memory planes wired and arranged to reduce signal reflection disturbances and propagation delays whereby to permit increased operating speed in the performance of a read-write cycle.

It is a further object to provide a memory array having digit conductors arranged to reduce the effects of "cross-talk" coupling of signals from one digit conductor pair to other nearby digit conductor pairs.

A memory according to an example of the invention includes an even number of memory planes arranged in a stack. Each plane has a top side and a bottom side, each side including an array of pairs of memory elements arranged in digit rows and word columns. Each pair of memory elements is used to store one binary information bit. Digit conductor pairs link pairs of memory elements along corresponding rows on the top sides of all planes, and digit conductor pairs link pairs of memory elements along corresponding rows on the bottom sides of all planes. The conductors of the digit conductor pairs extend between planes with alternating staggered straight paths and crossed paths. Characteristic impedance terminations are connected at both ends of all digit conductors, the digit conductors on the top sides of the planes having terminations on a first side of the stack and digit conductors on the bottom sides of the planes having terminations on the opposite second side of the stack. Digit drivers and differential sense amplifiers are coupled on the first and second sides of the stack to the midpoints of respective digit conductor pairs. Word conductors each link pairs of memory elements in corresponding columns on the top and bottom sides of each plane, half of the word conductors having both terminal ends on a third side of the stack, and the other half of the word conductors having both terminal ends on the opposite fourth side of the stack. Word conductor energizing means on the third and fourth sides of the stack are coupled to the terminal ends of the word conductors.

Figure 1:
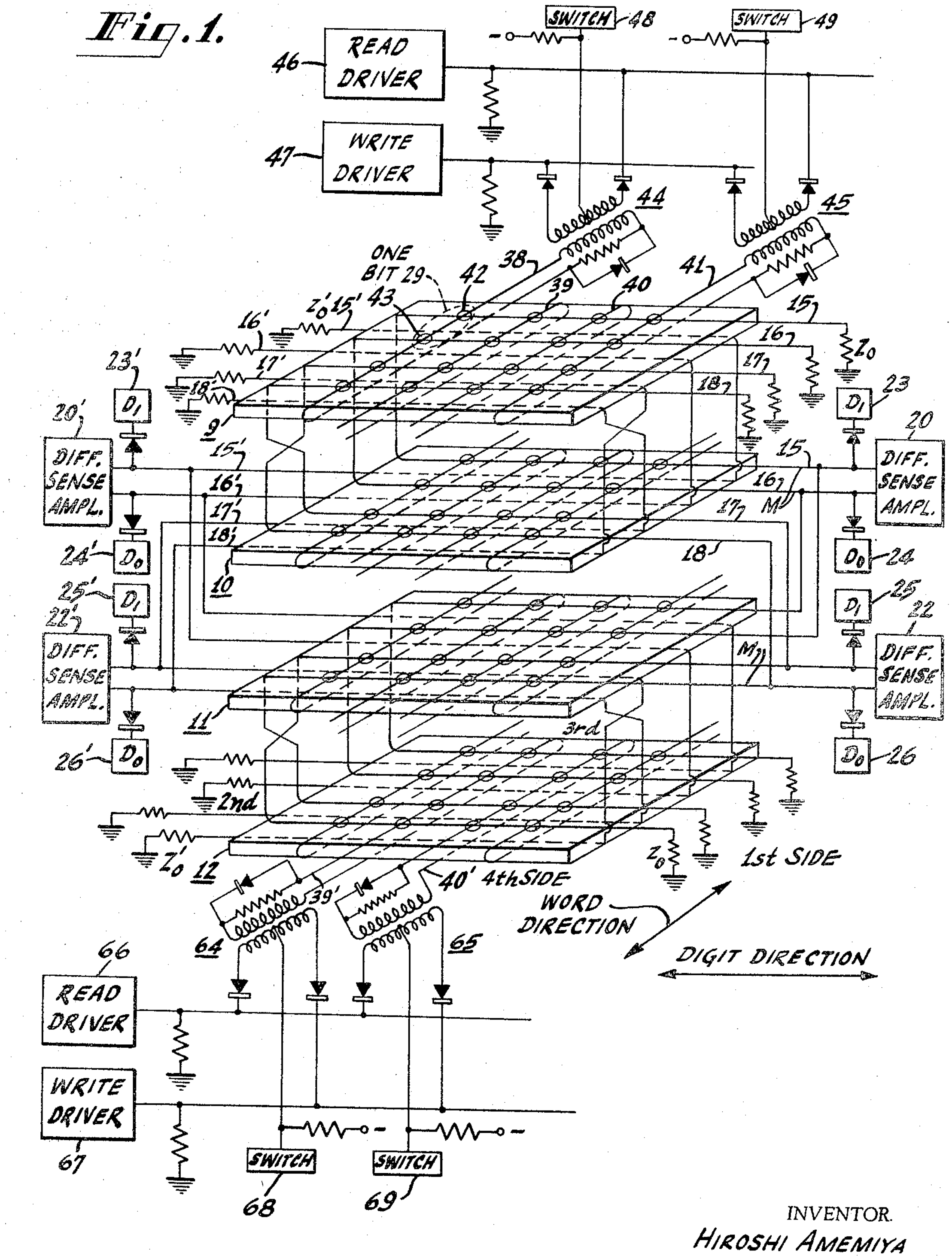
FIG. 1 is a schematic representation of a "two-core-per-bit" memory arrangement, according to the invention, which shows means for the storage of sixteen words of four bits each, and which is illustrative of arrangements for the storage of a much larger number of words each having a much larger number of bits.

Referring now in greater detail to FIG. 1, there is shown a memory stack having four memory planes 9, 10, 11 and 12 each provided with an array of pairs 29 of memory elements 42, 43 arranged in digit pair rows and word columns. (Memory elements, which are not visible in FIG. 1, are similarly arranged on the bottom sides of planes 9, 10, 11 and 12.) Digit conductors 15, 16, 17 and 18 link memory elements along corresponding rows on the top sides of all four planes. Each of the two ends of each digit conductor is connected through a respective terminating resistor $Z_0$, having the characteristic impedance of the line, to a point of reference potential such as ground.

The conductors 15 and 16 constitute a digit conductor pair, and the conductors 17 and 18 constitute another digit conductor pair. The conductors of the digit conductor pairs extend between planes with alternating staggered straight paths and crossed paths as illustrated more clearly in FIG. 2.

Figures 2, 3, 4, 5:
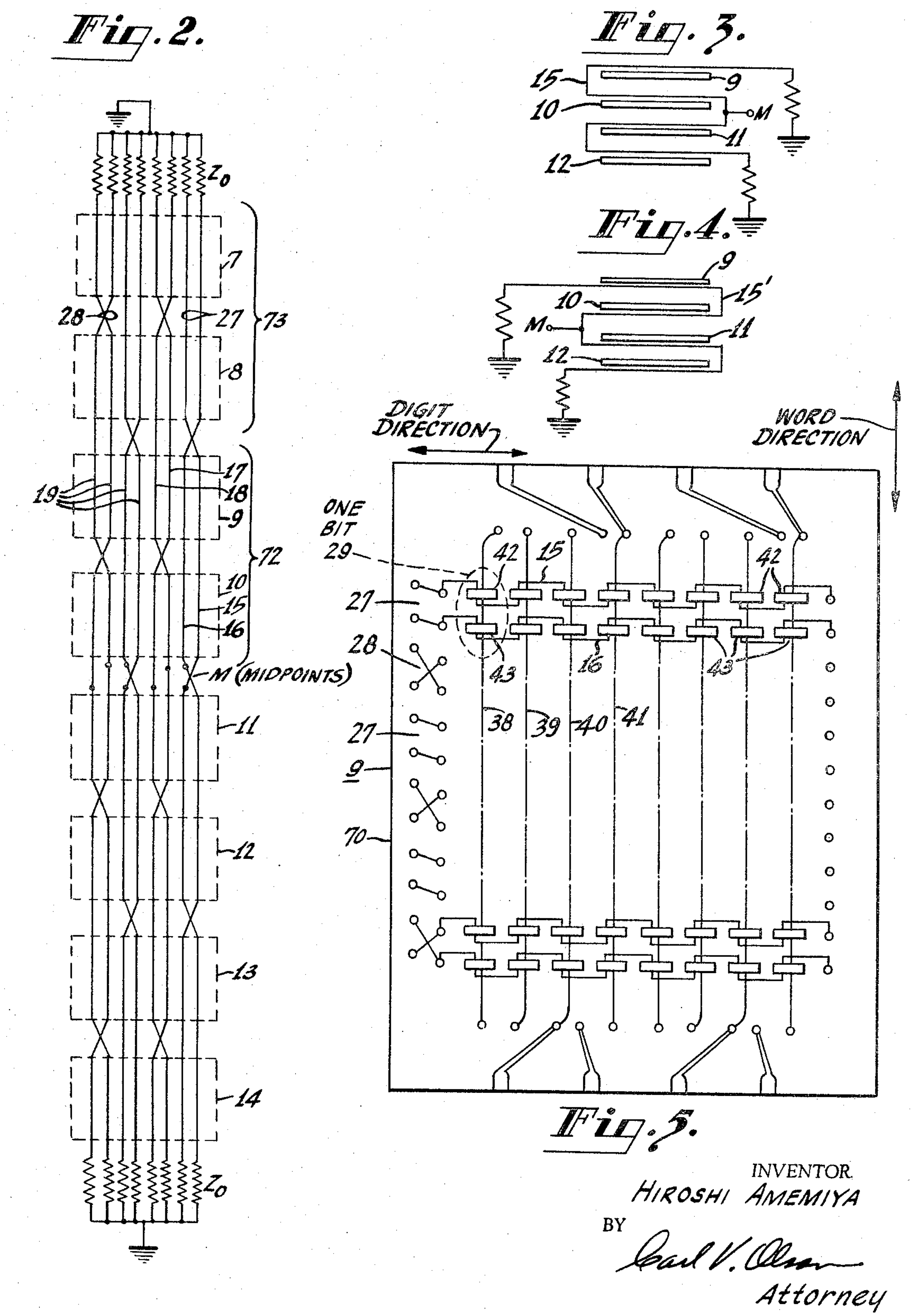
FIG. 2 is a wiring diagram illustrating how the digit conductor pairs in a memory like that of FIG. 1 extend between memory planes with alternating staggered straight paths and crossed paths to equalize undesired couplings.
FIG. 3 is a diagram illustrative of the course of digit conductors on the top sides of the memory planes of a memory stack.
FIG. 4 is a diagram illustrative of the course of digit conductors on the bottom sides of the memory planes of a memory stack.
FIG. 5 is a plan view of one side of a memory plane showing the mechanical arrangement of memory elements and conductors.

FIG. 2 is an unfolded wiring diagram illustrating the digit conductor pair wiring scheme on the top surfaces of planes 9, 10, 11 and 12 of FIG. 1 and as extended to four additional planes 7, 8, 13 and 14. The arrangement of the digit conductor pairs provides a desired equalization of coupled signals if there are four planes on each side of the midpoints M, or multiples of four planes. Only two planes on each side of the midpoints are shown in FIG. 1 in order to simplify the drawing intended to illustrate the whole system. FIG. 2 illustrates another extension of what is shown in FIG. 1 in that FIG. 2 shows additional digit conductors 19. The wiring pattern of digit conductors on the bottom sides of all planes is the complement of the pattern of top-side conductors shown in FIG. 2.

A pair of conductors are shown as having straight paths 27 between planes, and a pair of conductors are shown as having crossed paths 28 between planes. It will be understood that the planes 7 through 14 are referred to as units between which conductors of digit conductor pairs extend with alternating staggered straight and crossed paths, and that two units or "planes" may exist physically in one geometric plane.

Returning to FIG. 1, the midpoint M of digit conductor 15 is connected to the output of a "1" digit driver 23 and to one input of a differential sense amplifier 20. The midpoint M of the other conductor 16 of the digit pair is connected to the output of a "0" digit driver 24 and to the other input of differential sense amplifier 20. The midpoints of the conductors of the digit conductor pair 17, 18 are similarly connected to digit drivers 25 and 26 and to a differential sense amplifier 22.

The digit conductor pairs on the top surfaces of all of the planes 9, 10, 11 and 12, and the circuits to which they are connected, have now been described. The course of each digit conductor on the top surfaces of all planes is illustrated by the conductor 15 in FIG. 3. An additional similar and equal number of digit conductors are located on the bottom surfaces of each of all of planes 9 through 12 in the manner illustrated by the conductor 15' in FIG. 4. The digit conductor pairs on the top sides of all planes extend between planes on alternating sides of the stack so that the conductor pairs follow rectangular zigzag paths. The digit conductor pairs on the bottom sides of all planes extend between planes on different alternating sides of the stack so that the conductor pairs follow complementary rectangular zigzag paths.

It will be seen by comparing FIGS. 3 and 4 that the digit conductors on the top sides of the planes have a midpoint M on the right side of the stack, and that the digit conductors on the bottom sides of the planes have a midpoint M on the left side of the stack. In FIG. 1, the digit conductors on the bottom sides of the stack, and the circuits connected thereto, bear the same reference numerals, with primes added, as are applied to corresponding elements associated with the top sides of the planes.

Each of the planes 9, 10, 11 and 12 is provided with word conductors extending transversely of the digit conductors in a word or column direction, the word conductors on plane 9 being designated 38, 39, 40 and 41. Each word conductor links memory elements along a respective column of memory elements on both the top and bottom sides of the plane. The terminal ends of word conductors 38 and 41 are coupled by respective couplings 44 and 45 to word conductor energizing means including a read driver 46, a write driver 47, a switch 48 and a switch 49. The word conductors 39 and 40 have terminal ends on the opposite side of plane 9 which are connected to couplings (not shown) similar to couplings 44 and 45. The scheme followed is one wherein the word conductor 38 at one edge of the plane 9 has terminal edges on one side of the plane, the next following two word conductor- 39 and 40 have terminal ends on the other side of the plane, the next word conductor 41 and the following one (not shown) have terminal ends on the first side of the plane, and so on, in groups of two, until the remote edge of the plane is reached. The arrangement is one wherein half of the word conductors have terminal ends on one side of the plane and the other half of the word conductors have terminal ends on the other side of the plane.

The planes 10, 11 and 12 are similarly provided with individual word conductors. The word conductors 39' and 40' on plane 12 have terminal ends connected through couplings 64 and 65 to a read driver 66, a write driver 67, a switch 68 and a switch 69. The switches 68 and 69, in addition to being connected to couplings 64 and 65, are also connected to couplings (not shown) of word conductors in corresponding locations on all of the other planes, including the word conductors 39 and 40 of plane 9. Similarly, the switches 48 and 49, in addition to being connected to couplings 44 and 45 associated with plane 9, are also connected to corresponding couplings (not shown) associated with planes 10, 11 and 12. The read and write drivers (46 and 47) associated with a plane (9) are coupled to all of the word conductors (38, 39, 40, 41) on the respective plane (9).

The wiring configurations described in connection with FIGS. 1 through 4 are such as to provide a very high degree of wiring symmetry in the memory stack. The symmetry permits the achievement of many important electrical benefits and permits a mass production of uniform individual memory planes conveniently adapted for connection in the stack of memory planes.

FIG. 5 illustrates one side of a memory plane 9 consisting of an insulating base 70 supporting a plurality of pairs 29 of memory elements or cores 42, 43 arranged in digit pair rows and word columns. Each memory element 42 in a row is linked by a digit conductor 15, and each memory element 43 of the adjacent row is linked by the other digit conductor 16 of the digit conductor pair. The digit conductors may be printed conductors located in part on the insulating support 70 and located in part on sides and aperture walls (in the case of ferrite cores) of the memory elements. The word conductors, such as 38 through 41, may be wires threaded through the apertures of the aligned memory elements or cores. A pair 29 of memory elements 42, 43 is used for the storage of one information bit. Each digit conductor pair (15,16) links pairs of memory elements along a row pair, and each word conductor (38) links pairs of memory elements along a column.

The insulating support 70 is provided with terminals and through connections designed to facilitate the appropriate interconnection of conductors on both sides of all planes of a stack. The bottom side of plane 9 is substantially the same as the top side shown in FIG. 5.

The memory of FIGS. 1 through 5 is made up of planes forming a stack having 1st, 2nd, 3rd and 4th sides. The midpoints of digit conductors on the top sides of all planes are coupled to digit drivers and sense amplifiers on the 1st side of the stack. The midpoints of digit conductors on the bottom sides of all planes are coupled to digit drivers and sense amplifiers on the opposite 2nd side of the stack. Half of the word conductors on the top and bottom sides of each plane have terminations on a 3rd side of the stack, and the other half of the word conductors on the top and bottom sides of each plane have terminations on the opposite 4th side of the stack.

The distribution of the electronic components around the four sides of the stack permits the memory elements to be very small and close together, and close to the electronic components, so as to minimize propagation delays and to maximize the speed of operation of a read-write cycle.

The operation of the memory in a read-write cycle will now be described. If the stored word to be read out is located along word conductor 38, the word is selected by energizing the word switch 48 and the word read driver 46 to cause the coupling of a read pulse through coupling 44 to the word conductor 38. The read pulse switches the flux in one core of each of the four core pairs 29 on the top and bottom sides of the plane. This induces sense signals on a digit conductor of each of the four digit conductor pairs 15, 16; 17, 18; 15', 16'; and 17', 18'.

The induced sense signals each include two portions which are propagated in opposite directions from the memory core along the respective digit conductor. The portion of the sense signal on one of digit conductor pairs 15, 16 is propagated toward the terminations $Z_0$ and is absorbed there rather than being reflected. The portion propagated in the other direction reaches the corresponding input of differential sense amplifier 20 which recognizes the information bit that was stored in location 29 to be a "1" or a "0." Similarly, sense amplifiers 22, 20' and 22' respond to sense signals from the other bit locations along the selected word conductor 38.

To write information back into the word location of word conductor 38, the switch 48 is maintained energized while the write driver 47 is energized. At the same time, the "1" digit driver 23 or the "0" digit driver 24 is energized to write either a "1" or a "0" into the bit location 29. Simultaneously, one of the digit drivers of each of the other pairs 25, 26; 23', 24'; 25', 26' of digit drivers is energized to write desired information bits into the other three bit locations of the word.

During the reading of stored information bits along word conductor 38, a "1" sense signal is induced on one of digit conductors of the pairs 15, 16, and a "0" sense signal is induced on the other digit conductor of the pair. The sense amplifier 20 responds to the difference in amplitude of the two signals and provides a "1" or a "0" output depending on the polarity of the difference. It is important that the sense signals on digit conductors 15, 16 are not coupled as crosstalk to and through the nearby digit conductors 17, 18 to differential sense amplifier 22.

The manner in which the alternating staggered straight and crossed paths of the digit conductors between planes minimizes the effects of crosstalk will be described with references to the wiring scheme of FIG. 2. The signals on the portions of 72 of digit conductors 15, 16 on planes 9 and 10 are coupled as crosstalk in equal amounts to the corresponding portion of digit conductors 17, 18 because conductors 17, 18 are crossed between planes 9 and 10. The equal crosstalk signals on the digit conductor pair 17, 18 are balanced out or cancelled in the differential sense amplifier 22. The same is true regarding crosstalk from the portion 73 of digit conductor pair 15, 16 to the corresponding portion of digit conductor pair 17, 18 on planes 7 and 8.

The reverse-direction crosstalk in portion 72 is not equal, and does not cancel in sense amplifier 20. That is, sense signals on the portion 72 of digit conductors 17, 18 on planes 9 and 10 results in unequal crosstalk signals on the corresponding portions of digit conductors 15, 16. This is so because conductor 15 is always further than conductor 16 from the conductor pair 17, 18. However, signals on the portion 73 of digit conductors 17, 18 on planes 7 and 8 results in opposite-polarity unequal crosstalk signals on the portion 73 of digit conductors 15, 16. This is because conductor 16 is always further than conductor 15, in portion 73, from the conductor pair 17, 18. Therefore equal crosstalk signals appear on conductors 15, 16 and are cancelled in the differential sense amplifier 20, when both of portions 72 and 73 are considered. This explains why four planes or sections, or multiples thereof, are needed between midpoints M and the terminations $Z_0$.

The arrangement is one wherein the crosstalks from one digit conductor to the two conductors of a nearby digit conductor pair are equal and are cancelled in the differential sense amplifier.

Another advantage of the digit conductor wiring scheme of FIGS. 1 and 2 is that it simplifies the design and construction of reflection-preventing terminations for the digit conductor pairs. The resulting improved terminations reduce the time following writing for digit pulse disturbances to die down sufficiently to permit reading.

What is claimed is:

1. The combination of an array of pairs of memory elements arranged in digit pair rows and word columns and divided into an even number of units in the digit direction, and digit conductor pairs linking pairs of memory elements along corresponding rows, the conductors of the digit conductor pairs extending between units with alternating staggered straight paths and crossed paths, the alternating straight and crossed paths of each pair being staggered relative to the alternating straight and crossed paths of adjacent pairs so that a straight path of one pair and a crossed path of an adjacent pair are side-by-side.

2. The combination of an array of pairs of memory elements arranged in digit pair rows and word columns and divided into an even number of units in the digit direction, digit conductor pairs linking pairs of memory elements along corresponding rows, the conductors of the digit conductor pairs extending between units with alternating staggered straight paths and crossed paths, the alternating straight and crossed paths of each pair being staggered relative to the alternating straight and crossed paths of adjacent pairs so that a straight path of one pair and a crossed path of an adjacent pair are side-by-side, and digit drivers and sense amplifiers coupled to the midpoints of respective digit conductor pairs.

3. The combination of an array of pairs of memory elements arranged in digit pair rows and word columns and divided into an even number of units in the digit direction, digit conductor pairs linking pairs of memory elements along corresponding rows, the conductors of the digit conductor pairs extending between units with alternating staggered straight paths and crossed paths, the alternating straight and crossed paths of each pair being staggered relative to the alternating straight and crossed paths of adjacent pairs so that a straight path of one pair and a crossed path of an adjacent pair are side-by-side, and impedance terminations connected at both ends of all digit conductors, and digit drivers and sense amplifiers coupled to the midpoints of respective digit conductor pairs.

4. The combination of an array of pairs of memory elements arranged in digit pair rows and word columns and divided into an even number of planes in the digit direction, digit conductor pairs linking pairs of memory elements along corresponding rows, the conductors of the digit conductor pairs extending between planes with alternating staggered straight paths and crossed paths, characteristic impedance terminations connected at both ends of all digit conductors, and digit drivers and differential sense amplifiers coupled to the midpoints of respective digit conductor pairs.

5. A memory stack comprising an even plurality of memory planes arranged in a stack and each having a top side and a bottom side, each side including an array of pairs of memory elements arranged in digit pair rows and word columns, and digit conductor pairs linking pairs of memory elements along corresponding rows on the top sides of all planes, and digit conductor pairs linking pairs of memory elements along corresponding rows on the bottom sides of all planes, the conductors of the digit conductor pairs on each of the top and bottom sides of all planes extending between planes with alternating staggered straight paths and crossed paths.

6. A memory stack comprising an even plurality of memory planes arranged in a stack and each having a top side and a bottom side, each side including an array of pairs of memory elements arranged in digit pair rows and word columns, and digit conductor pairs linking pairs of memory elements along corresponding rows on the top sides of all planes, and digit conductor pairs linking pairs of memory elements along corresponding rows on the bottom sides of all planes, the conductors of the digit conductor pairs on each of the top and bottom sides of all planes extending between planes with alternating staggered straight paths and crossed paths, the digit conductor pairs on the top sides of all planes extending between planes on alternating sides of the stack so that the conductor pairs follow rectangular zigzag paths, the digit conductor pairs on the bottom sides of all planes extending between planes on different alternating sides of the stack so that the conductor pairs follow complementary rectangular zigzag paths.

7. A memory comprising an even plurality of memory planes arranged in a stack and each having a top side and a bottom side, each side including an array of pairs of memory elements arranged in digit pair rows and word columns, digit conductor pairs linking pairs of memory elements along corresponding rows on the top sides of all planes, and digit conductor pairs linking pairs of memory elements along corresponding rows on the bottom sides of all planes, the conductors of the digit conductor pairs on each of the top and bottom sides of all planes extending between planes with alternating staggered straight paths and crossed paths, the digit conductor pairs on the top sides of all planes extending between planes on alternating sides of the stack so that the conductor pairs follow rectangular zigzag paths, the digit conductor pairs on the bottom sides of all planes extending between planes on different alternating sides of the stack so that the conductor pairs follow complementary rectangular paths, impedance terminations connected at both ends of all digit conductors, the digit conductors on the top sides of the planes having terminations on a first side of the stack and digit conductors on the bottom sides of the planes having terminations on the opposite second side of the stack, and digit drivers and differential sense amplifiers coupled on said first and second sides of the stack to the midpoints of respective digit conductor pairs.

8. A memory comprising an even plurality of memory planes arranged in a stack and each having a top side and a bottom side, each side including an array of memory elements arranged in digit rows and word columns, digit conductors linking memory elements along corresponding rows on the top sides of all planes, and digit conductors linking memory elements along corresponding rows on the bottom sides of all planes, characteristic impedance terminations connected at both ends of all digit conductors, digit drivers and sense amplifiers coupled to the midpoints of respective digit conductors, and word conductors each linking memory elements in corresponding columns on the top and bottom sides of each plane.

9. A memory comprising an even plurality of memory planes arranged in a stack and each having a top side and a bottom side, each side including an array of memory elements arranged in digit rows and word columns, digit conductors linking memory elements along corresponding rows on the top sides of all planes, and digit conductors linking memory elements along corresponding rows on the bottom sides of all planes, characteristic impedance terminations connected at both ends of all digit conductors, the digit conductors on the top sides of the planes having terminations on a first side of the stack and digit conductors on the bottom sides of the planes having terminations on the opposite second side of the stack, digit drivers and sense amplifiers coupled on said first and second sides of the stack to the midpoints of respective digit conductors, and word conductors each linking memory elements in corresponding columns on the top and bottom sides of each plane.

10. A memory comprising an even plurality of memory planes arranged in a stack and each having a top side and a bottom side, each side including an array of memory elements arranged in digit rows and word columns, digit conductors linking memory elements along corresponding rows on the top sides of all planes, and digit conductors linking memory elements along corresponding rows on the bottom sides of all planes, characteristic impedance terminations connected at both ends of all digit conductors, the digit conductors on the top sides of the planes having terminations on a first side of the stack and digit conductors on the bottom sides of the planes having terminations on the opposite second side of the stack, digit drivers and sense amplifiers coupled on said first and second sides of the stack to the midpoints of respective digit conductors, word conductors each linking memory elements in corresponding columns on the top and bottom sides of each plane, half of said word conductors having both terminal ends on a third side of the stack, and the other half of said word conductors having both terminal ends on the opposite fourth side of the stack, and word conductor energizing means on said third and fourth sides of the stack coupled to the terminal ends of said word conductors.

11. A memory comprising an even plurality of memory planes arranged in a stack and each having a top side and a bottom side, each side including an array of pairs of memory elements arranged in digit pair rows and word columns, digit conductor pairs linking pairs of memory elements along corresponding rows on the top sides of all planes, and digit conductor pairs linking pairs of memory elements along corresponding rows on the bottom sides of all planes, the conductors of the digit conductor pairs on the top sides of all planes extending between planes with alternating staggered straight paths and crossed paths, the conductors of the digit conductor pairs on the bottom sides of all planes extending between planes with alternating staggered straight paths and crossed paths, the digit conductor pairs on the top sides of all planes extending between planes on alternating sides of the stack so that the conductor pairs follow rectangular zigzag paths, the digit conductor pairs on the bottom sides of all planes extending between planes on different alternating sides of the stack so that the conductor pairs follow complementary rectangular zigzag paths, characteristic impedance terminations connected at both ends of all digit conductors, the digit conductors on the top sides of the planes having terminations on a first side of the stack and digit conductors on the bottom sides of the planes having terminations on the opposite second side of the stack, digit drivers and differential sense amplifiers coupled on said first and second sides of the stack to the midpoints of respective digit conductor pairs, word conductors each linking pairs of memory elements in corresponding columns on the top and bottom sides of each plane, half of said word conductors having both terminal ends on a third side of the stack, and the other half of said word conductors having both terminal ends on the opposite fourth side of the stack, and word conductor energizing means (on said third and fourth sides of the stack) coupled to the terminal ends of said word conductors.

References Cited by the Examiner

UNITED STATES PATENTS

| | | | |
|---|---|---|---|
| 3,161,860 | 12/1964 | Grooteboer | 340—174 |
| 3,181,131 | 4/1965 | Pryor et al. | 340—174 |
| 3,181,132 | 4/1965 | Amemiya | 340—174 |
| 3,191,163 | 6/1965 | Crawford | 340—174 |
| 3,201,767 | 8/1965 | Bradley | 340—174 |
| 3,214,740 | 10/1965 | Booth | 340—174 |

BERNARD KONICK, *Primary Examiner.*

J. BREIMAYER, *Assistant Examiner.*